United States Patent
Guinn et al.

(10) Patent No.: US 9,828,868 B2
(45) Date of Patent: Nov. 28, 2017

(54) HINGED SEAL USING WIRE MESH

(71) Applicant: United Technologies Corporation, Hartford, CT (US)

(72) Inventors: Witt C. Guinn, Portland, CT (US); Shawn M. McMahon, Agawam, MA (US)

(73) Assignee: United Technologies Corporation, Farmington, CT (US)

( * ) Notice: Subject to any disclaimer, the term of this patent is extended or adjusted under 35 U.S.C. 154(b) by 231 days.

(21) Appl. No.: 14/739,016

(22) Filed: Jun. 15, 2015

(65) Prior Publication Data

US 2016/0076391 A1    Mar. 17, 2016

Related U.S. Application Data

(60) Provisional application No. 62/049,068, filed on Sep. 11, 2014.

(51) Int. Cl.
| | | |
|---|---|---|
| *F01D 11/00* | (2006.01) | |
| *F02C 7/28* | (2006.01) | |
| *F02K 1/80* | (2006.01) | |
| *F16J 15/08* | (2006.01) | |

(52) U.S. Cl.
CPC .............. *F01D 11/005* (2013.01); *F02C 7/28* (2013.01); *F02K 1/805* (2013.01); *F05D 2220/32* (2013.01); *F05D 2240/55* (2013.01); *F05D 2240/57* (2013.01); *F05D 2240/59* (2013.01); *F05D 2260/52* (2013.01); *F05D 2300/601* (2013.01); *F16J 15/0887* (2013.01); *Y02T 50/672* (2013.01)

(58) Field of Classification Search
CPC ...... F16J 15/021; F16J 15/0887; F02K 1/805; F05D 2240/57; F05D 2240/59; F02C 7/28
See application file for complete search history.

(56) References Cited

U.S. PATENT DOCUMENTS

| | | | |
|---|---|---|---|
| 735,912 A | 8/1903 | Schrotz | |
| 1,892,144 A * | 12/1932 | Griffin | ................ B65D 88/46 |
| | | | 220/224 |
| 2,865,165 A | 12/1958 | Kress | |
| 2,927,424 A | 3/1960 | Hyde | |
| 4,184,689 A | 1/1980 | Brodell et al. | |
| 4,318,668 A | 3/1982 | Chaplin et al. | |
| 4,405,137 A * | 9/1983 | Webb | ................ F16J 15/34 |
| | | | 277/553 |
| 4,575,099 A * | 3/1986 | Nash | ................ F02K 1/805 |
| | | | 239/265.37 |
| 4,645,217 A * | 2/1987 | Honeycutt, Jr. | ...... F01D 11/005 |
| | | | 277/555 |

(Continued)

OTHER PUBLICATIONS

Extended European Search Report for Application No. 15184951.0, dated Feb. 1, 2016, 7 pages.

*Primary Examiner* — Nicholas L Foster

(74) *Attorney, Agent, or Firm* — Kinney & Lange, P.A.

(57) ABSTRACT

A seal segment includes a flapper seal, a wire mesh acting as a hinge for the flapper seal, and a spring. The flapper seal has a first surface and a second surface. The wire mesh includes a first section connected to the first surface of the flapper seal and a second section connected to the first section. The spring includes a first end that is in contact with the first section of the wire mesh to apply pressure to the first surface of the flapper seal and a second end adjacent the second section of the wire mesh.

18 Claims, 6 Drawing Sheets

(56) References Cited

U.S. PATENT DOCUMENTS

| | | | |
|---|---|---|---|
| 5,099,886 A * | 3/1992 | Squirrell | F16K 1/16 137/527 |
| 5,118,120 A | 6/1992 | Drerup et al. | |
| 5,143,292 A * | 9/1992 | Corsmeier | F02K 1/12 239/127.3 |
| 5,154,577 A | 10/1992 | Kellock et al. | |
| 5,542,684 A * | 8/1996 | Squirrell | F16K 1/16 251/174 |
| 5,797,723 A * | 8/1998 | Frost | F01D 11/005 415/174.2 |
| 5,927,534 A * | 7/1999 | King | B65D 88/46 220/222 |
| 6,065,756 A | 5/2000 | Eignor et al. | |
| 6,431,555 B1 * | 8/2002 | Schroder | F01D 11/005 277/628 |
| 6,464,457 B1 * | 10/2002 | Morgan | F01D 11/005 277/630 |
| 6,527,274 B2 * | 3/2003 | Herron | F16J 15/3292 277/301 |
| 6,599,089 B2 * | 7/2003 | Aksit | F01D 11/005 415/191 |
| 6,609,885 B2 * | 8/2003 | Mohammed-Fakir | F01D 9/041 415/191 |
| 6,637,751 B2 * | 10/2003 | Aksit | F01D 9/041 277/416 |
| 6,637,752 B2 | 10/2003 | Aksit et al. | |
| 6,637,753 B2 | 10/2003 | Mohammed-Fakir et al. | |
| 8,257,028 B2 * | 9/2012 | Morgan | F01D 11/005 415/135 |
| 8,459,041 B2 * | 6/2013 | Flanagan | F01D 9/023 60/752 |
| 2006/0197287 A1 * | 9/2006 | Farah | F01D 11/003 277/549 |
| 2012/0211943 A1 | 8/2012 | Hefner et al. | |
| 2013/0048749 A1 | 2/2013 | McMahon et al. | |
| 2013/0256993 A1 | 10/2013 | Burd et al. | |
| 2014/0102108 A1 | 4/2014 | Kramer | |
| 2014/0183825 A1 | 7/2014 | Chuong et al. | |
| 2015/0360795 A1 * | 12/2015 | Livingston | B64D 45/00 244/129.2 |

* cited by examiner

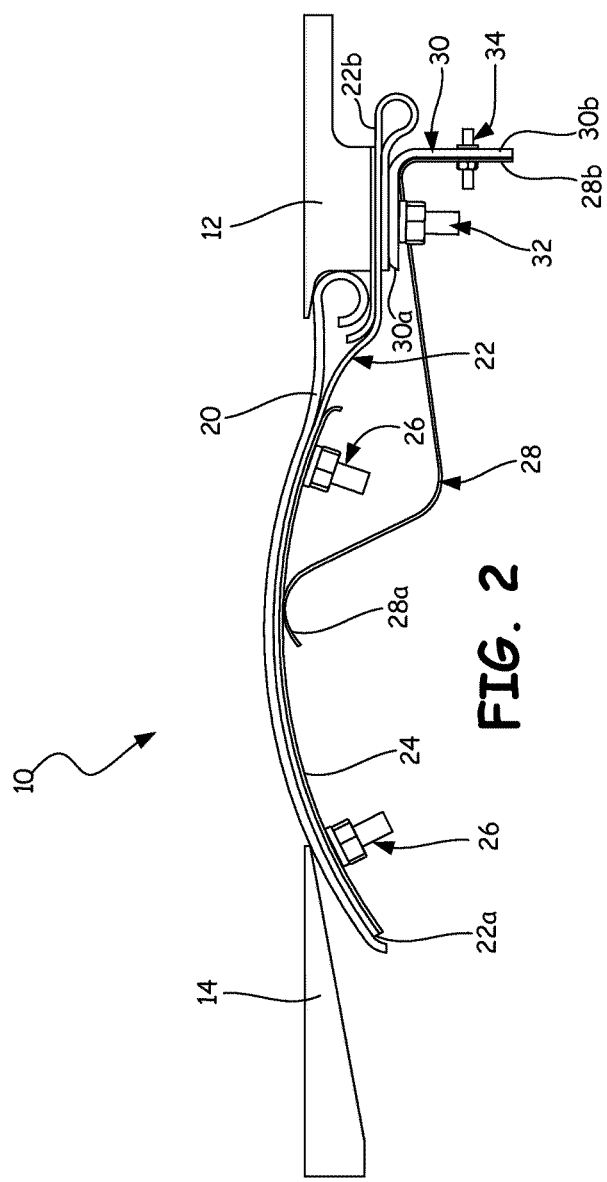

HINGED SEAL USING WIRE MESH

CROSS-REFERENCE TO RELATED APPLICATION(S)

This application claims the benefit of U.S. Provisional Application No. 62/049,068 filed Sep. 11, 2014 for "HINGED SEAL USING WIRE MESH" by Witt C. Guinn and Shawn M. McMahon.

BACKGROUND

The present invention relates to seals, and in particular, to a hinged seal for use in a gas turbine engine.

Gas turbine engines operate according to a continuous gas flow. Air enters the gas turbine engine through a fan section and is pressurized in a compressor section. From the compressor section, the pressurized air enters a central combustor section where fuel is added and the air is ignited. Air from the combustor then expands through a turbine section where bladed rotors convert the thermal energy into mechanical energy to rotate one or more centrally mounted shafts that drive the compressor section. Due to their compact and powerful nature, gas turbine engines are suitable for powering aircraft, heavy equipment, ships, and electrical power generators. Seals are often used in gas turbine engines to discourage certain airflow and seal off cavities from one another.

Finger seals are the most common type of seal found in gas turbine engines. The typical finger seal includes two pieces of thin sheet metal containing numerous slits, the two pieces being offset in order to prevent alignment of the slits. Finger seals can accommodate high pressure, but may not be able to accommodate a long sealing span with a large offset between the two components to be sealed. Hinged seals may also be found in gas turbine engines. The typical hinged seal includes a thick metal stand containing a hinge pin. The hinged seal can withstand high pressure and a large offset between the two components to be sealed. However, hinged seals are prone to high leakage because they require clearance gaps in order to freely rotate. A seal that can withstand high pressure and high temperature while also withstanding a large offset and reducing leakage would be advantageous.

SUMMARY

A seal segment includes a flapper seal, a wire mesh acting as a hinge for the flapper seal, and a spring. The flapper seal has a first surface and a second surface. The wire mesh includes a first section connected to the first surface of the flapper seal and a second section connected to the first section. The spring includes a first end that is in contact with the first section of the wire mesh to apply pressure to the first surface of the flapper seal and a second end adjacent the second section of the wire mesh.

BRIEF DESCRIPTION OF THE DRAWINGS

FIG. 2 is a side view of the seal segment, which is inverted with respect to the view shown in FIG. 1.

DETAILED DESCRIPTION

Figure 1:
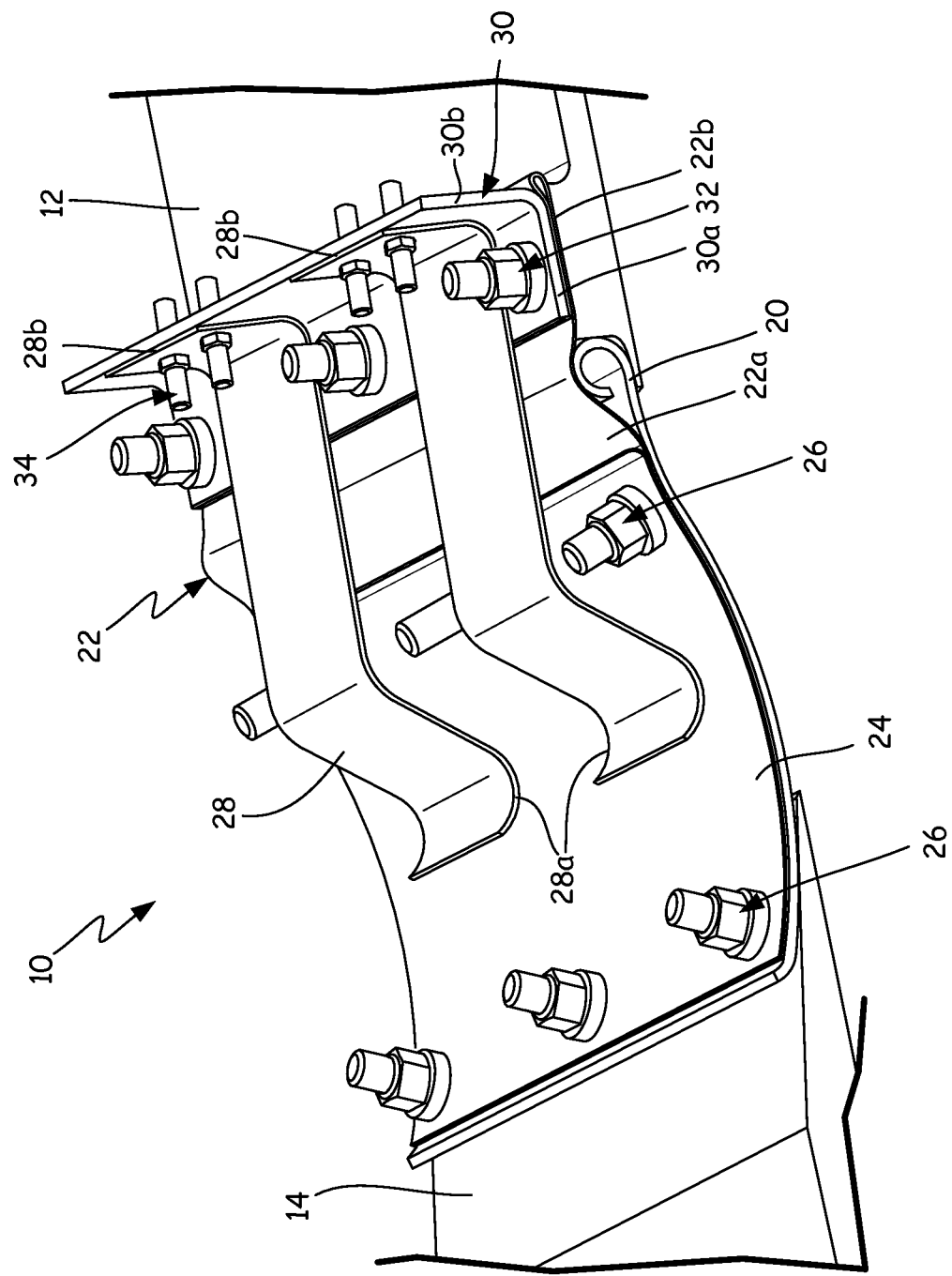
FIG. 1 is a perspective view of a seal segment positioned between a first gas turbine engine component and a second gas turbine engine component.

FIG. 1 is a perspective view of seal segment 10 positioned between first gas turbine engine component 12 and second gas turbine engine component 14. FIG. 2 is a side view of seal segment 10, which is inverted with respect to FIG. 1. FIGS. 1 and 2 show seal segment 10, first gas turbine engine component 12, and second gas turbine engine component 14. Seal segment 10 includes flapper seal 20, wire mesh 22, backing sheet 24, first fasteners 26, finger springs 28, bracket 30, second fasteners 32, and third fasteners 34. Seal segment 10 is attached to first gas turbine engine component 12 and in contact with second gas turbine engine component 14 to span the gap and prevent airflow between the two components.

A first surface of flapper seal 20 is connected to first section 22a of wire mesh 22. First section 22a of wire mesh 22 extends across the first surface of flapper seal 20. Second section 22b of wire mesh 22 does not contact flapper seal 20 and is folded over to reduce fraying of wire mesh 22. Alternatively, second section 22b of wire mesh 22 is brazed to reduce fraying of wire mesh 22. Backing sheet 24 is connected to first section 22a of wire mesh 22, positioned so that wire mesh 22 is between flapper seal 20 and backing sheet 24. First fasteners 26 connect wire mesh 22 and backing sheet 24 to flapper seal 20. In alternate embodiments, first fasteners 26 are not included. Instead, wire mesh 22 can be connected to flapper seal 20 by welding, brazing, other mechanical attachment mechanisms, or any other suitable connector. Likewise, backing sheet 24 can be connected to wire mesh 12 by welding, brazing, other mechanical attachment mechanisms, or any other suitable connector. Finger spring 28 has first end 28a in contact with backing sheet 24 and second end 28b adjacent second section 22b of wire mesh 22. In alternate embodiments, finger spring 28 can be any spring that is capable of extending between backing sheet 24 and second section 22b of wire mesh 22. In further alternate embodiments, backing sheet 24 is not included and first end 28a of finger spring 28 will be in contact with wire mesh 22 to apply pressure to the first surface of flapper seal 20. Bracket 30 has first end 30a connected to second section 22b of wire mesh 22 and second end 30b connected to second end 28b of finger spring 28. Second fasteners 32 connect wire mesh 22 to first end 30a of bracket 30. Third fasteners 34 connect finger spring 28 to second end 30b of bracket 30.

Seal segment 10 extends between first gas turbine engine component 12 and second gas turbine engine component 14. Flapper seal 20 is in contact with first gas turbine engine component 12 and second gas turbine engine component 14. Second section 22b of wire mesh 22 is attached to first gas turbine engine component 12 to connect flapper seal 20 to first gas turbine engine component 12 and act as a hinge for flapper seal 20. In the embodiment shown in FIGS. 1 and 2, bracket 30 is L-shaped. Further, the number of first fasteners 26, second fasteners 32, and third fasteners 34 that are used can vary depending on the size of seal segment 10 and the design loads on seal segment 10. Second fasteners 32 connect second section 22b of wire mesh 22 and first end 30a of bracket 30 to first gas turbine engine component 12. In alternate embodiments, second fasteners 32 are not included. Instead, wire mesh 22 may be attached to first end 30a of bracket 30 or first gas turbine engine component 12 by other means. Second end 28b of finger spring 28 is attached to second end 30b of bracket 30 with third fasteners 34. In alternate embodiments, bracket 30 and third fasteners 34 are not included. Instead, second end 28b of finger spring 28 is adjacent second section 22b of wire mesh 22 and may be attached to first gas turbine engine component 12 by other means. Second fastener 32 may connect wire mesh 22 to first gas turbine engine component 12.

Flapper seal 20 may have a flat or arcuate contour depending on the position of seal segment 10. The contour of flapper seal 20 can be altered to provide as smooth a sealing surface as possible for the specific offset of first gas turbine engine component 12 and second gas turbine engine component 14. Seal segment 10 may be flat or arcuate depending on the contours of first gas turbine engine component 12 and second gas turbine engine component 14 and manufacturing needs.

Additionally, flapper seal 20, wire mesh 22, and finger spring 28 are metal. Specifically, wire mesh 22 can be made of any metal that can be formed into wire, such as nickel alloys, cobalt alloys, or stainless steel. In general, the type of metal selected for wire mesh 22 will depend upon the temperature and pressure of the target operating environment. The weave, thread count, and wire diameter of the wire mesh can be adjusted based on the desired flexibility, leakage prevention, and load capability. The thickness of wire mesh 22 is dependent on the pressure of the operating environment. Flapper seal 20 and backing sheet 24 can be made of metal, ceramic, or composite-based material. Bracket 30 and finger spring 28 can be altered based on desired preload, stiffness, and attachment geometry.

Seal segment 10 seals the space between first gas turbine engine component 12 and second gas turbine engine component 14. Flapper seal 20 spans the gap between first gas turbine engine component 12 and second gas turbine engine component 14. A second surface of flapper seal 20 provides a smooth and continuous surface for airflow between first gas turbine engine component 12 and second gas turbine engine component 14. Flapper seal 20 also withstands high temperatures and pressures. Wire mesh 22 is flexible and acts as a hinge for flapper seal 20, allowing flapper seal 20 to move to accommodate deflections due to offset between first gas turbine engine component 12 and second gas turbine engine component 14. Prior art seals that do not include wire mesh have more rigid hinges that result in higher leakage. Furthermore, wire mesh 22 spans the gaps between adjacent seal segments 10. Backing sheet 24 is used as a clamp to hold wire mesh 22 to flapper seal 20. Backing sheet 24 also provides a wear surface for finger spring 28, preventing breakage of finger spring 28 and reducing wear of wire mesh 22. First end 28a of finger spring 28 applies pressure to the first surface of flapper seal 20 to create preload under non-pressurized conditions, which ensures flapper seal 20 maintains contact with second gas turbine engine component 14. Bracket 30 serves as a means for attaching finger spring 28 to first gas turbine engine component 12 and is also used as a clamp to hold wire mesh 22 to first gas turbine engine component 12.

Seal segment 10 can be utilized in challenging environments of high temperature, high pressure, and large deflection. Flapper seal 20 can withstand high temperatures and pressures and wire mesh 22 can withstand large deflections. Because wire mesh 22 spans the gaps between adjacent seal segments 10, leakage is reduced. Further, by providing a wear surface for finger spring 28, backing sheet 24 prolongs the life of finger spring 28 and wire mesh 22. Finger spring 28 is capable of handling large deflections because it is not required to handle a pressure load. Moreover, by adjusting the size, shape, or material of flapper seal 20, wire mesh 22, and finger spring 28 to suit specific operating environments, seal segment 10 can be used in many different settings.

Figure 3A:
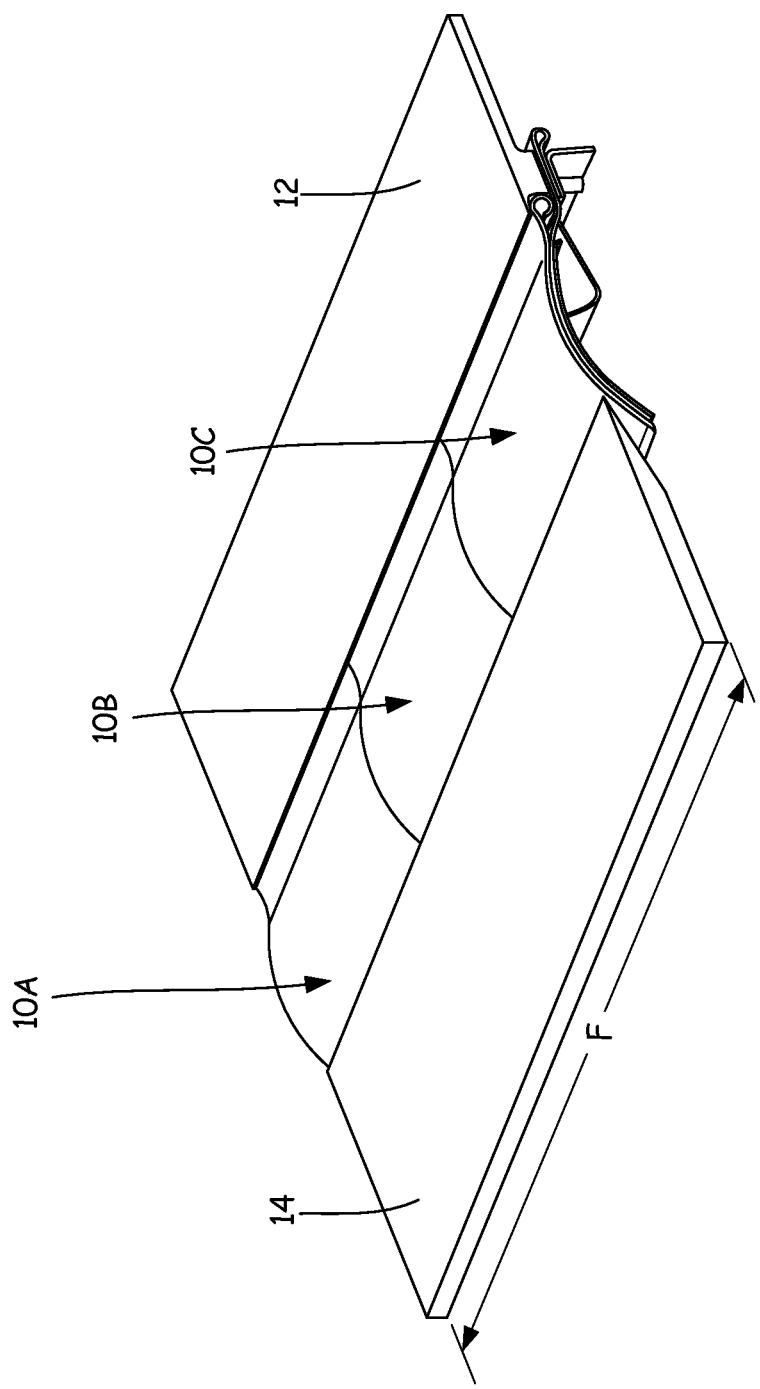
FIG. 3A is a perspective view of a first side of an embodiment of a series of the seal segments arranged between two flat surfaces.
Figure 3B:
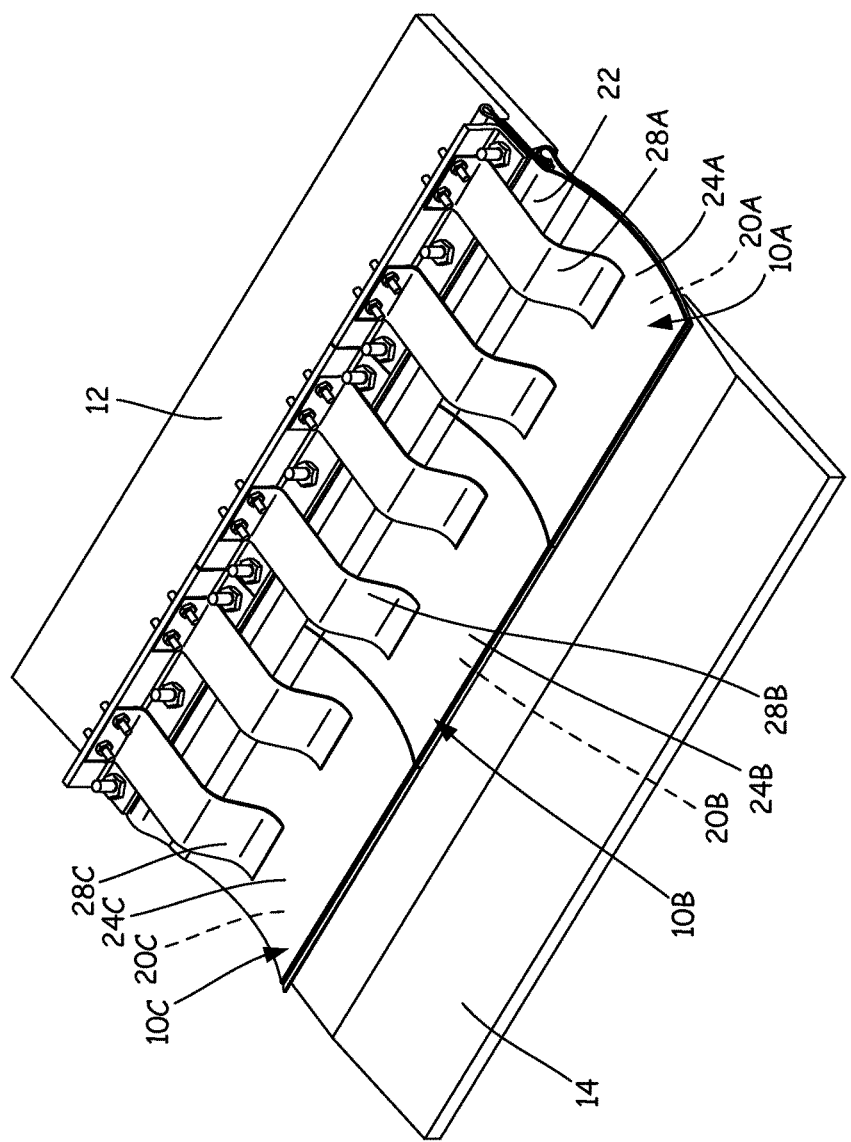
FIG. 3B is a perspective view of a second side of the embodiment of the series of the seal segments seen in FIG. 3A, illustrating a continuous wire mesh hinge.

FIG. 3A is a perspective view of a first side of an embodiment of a series of seal segments 10 arranged between a flat surface of first gas turbine engine component 12 and a flat surface of second gas turbine engine component 14. FIG. 3B is a perspective view of a second side of the embodiment of the series of seal segments 10 seen in FIG. 3A, illustrating continuous wire mesh 22. The series of seal segments 10 includes seal segment 10A, seal segment 10B, and seal segment 10C. Seal segment 10A includes flapper seal 20A, wire mesh 22, backing sheet 24A, and finger spring 28A. Seal segment 10B includes flapper seal 20B, wire mesh 22, backing sheet 24B, and finger spring 28B. Seal segment 10C includes flapper seal 20C, wire mesh 22, backing sheet 24C, and finger spring 28C.

Seal segment 10A, seal segment 10B, and seal segment 10C are positioned adjacent each other to seal the gap between the flat surface of first gas turbine engine component 12 and the flat surface of second gas turbine engine component 14. Seal segments 10A, 10B, and 10C are flat along direction F because they are sealing two flat surfaces, as seen in FIGS. 3A and 3B. Seal segment 10A, seal segment 10B, and seal segment 10C each have separate flapper seals 20, backing sheets 24, and finger springs 28 but each include the same segment of wire mesh 22. Wire mesh 22 is continuous and extends across the series of seal segments 10 so that it covers the gap between seal segments 10A and 10B and the gap between seal segments 10B and 10C.

Seal segments 10 will result in a tight seal because they are flat along direction F. Seal segments 10 also allow for reduced manufacturing challenges and lower cost. Using the same segment of wire mesh 22 among all of the seal segments reduces leakage from gaps between seal segments 10 and gives greater structural integrity to the series of seal segments 10.

In an alternate embodiment, wire mesh 22 is not a single segment but a plurality of segments of wire mesh 22. However, wire mesh 22 is still continuous across gaps between seal segments 10 arranged in a series. Consequently, wire mesh 22 in this embodiment still reduces leakage from gaps between seal segments 10 while also allowing for simplified seal assembly to accommodate a large gap.

Figure 4A:
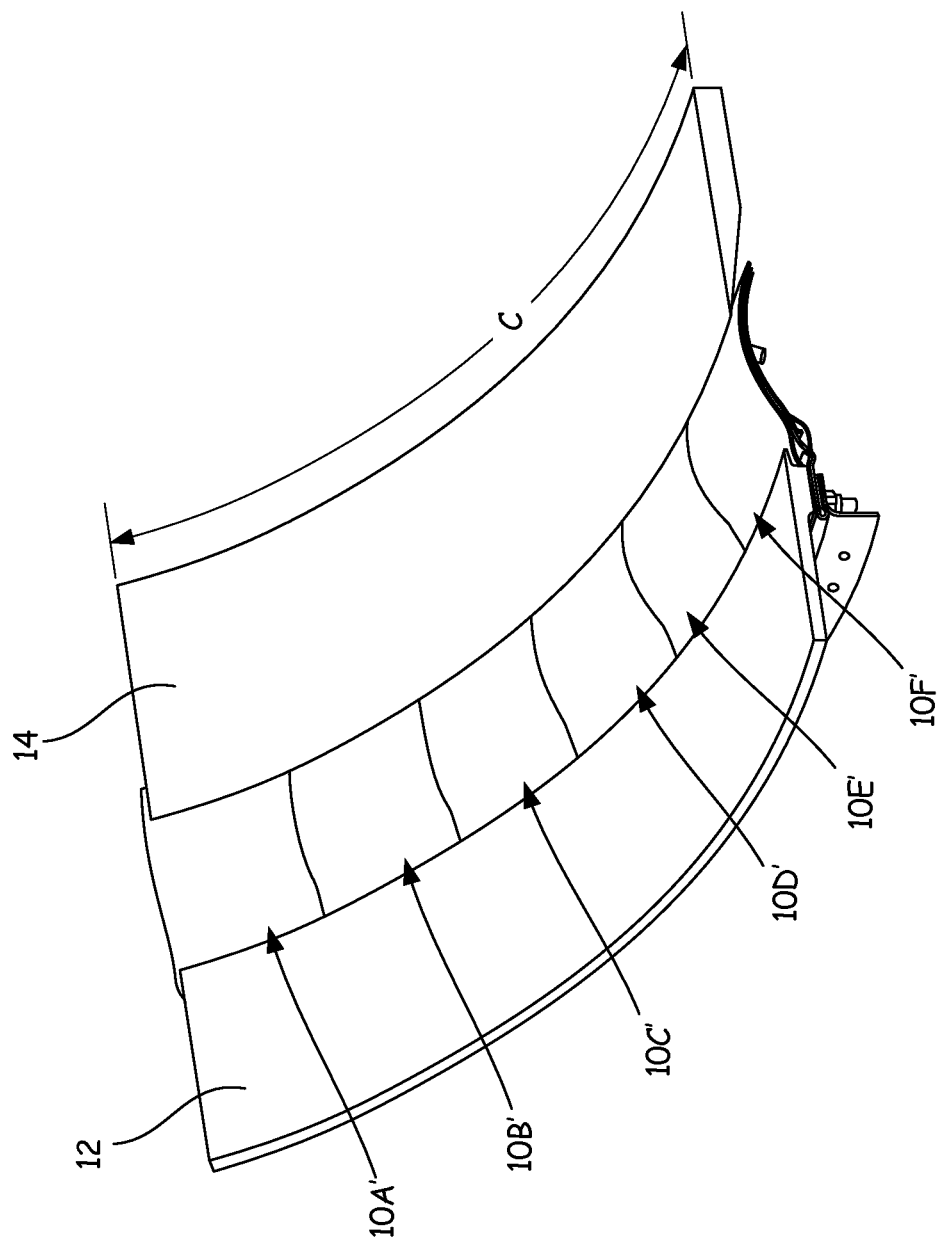
FIG. 4A is a perspective view of a first side of an embodiment of a series of the seal segments arranged between two curved surfaces.
Figure 4B:
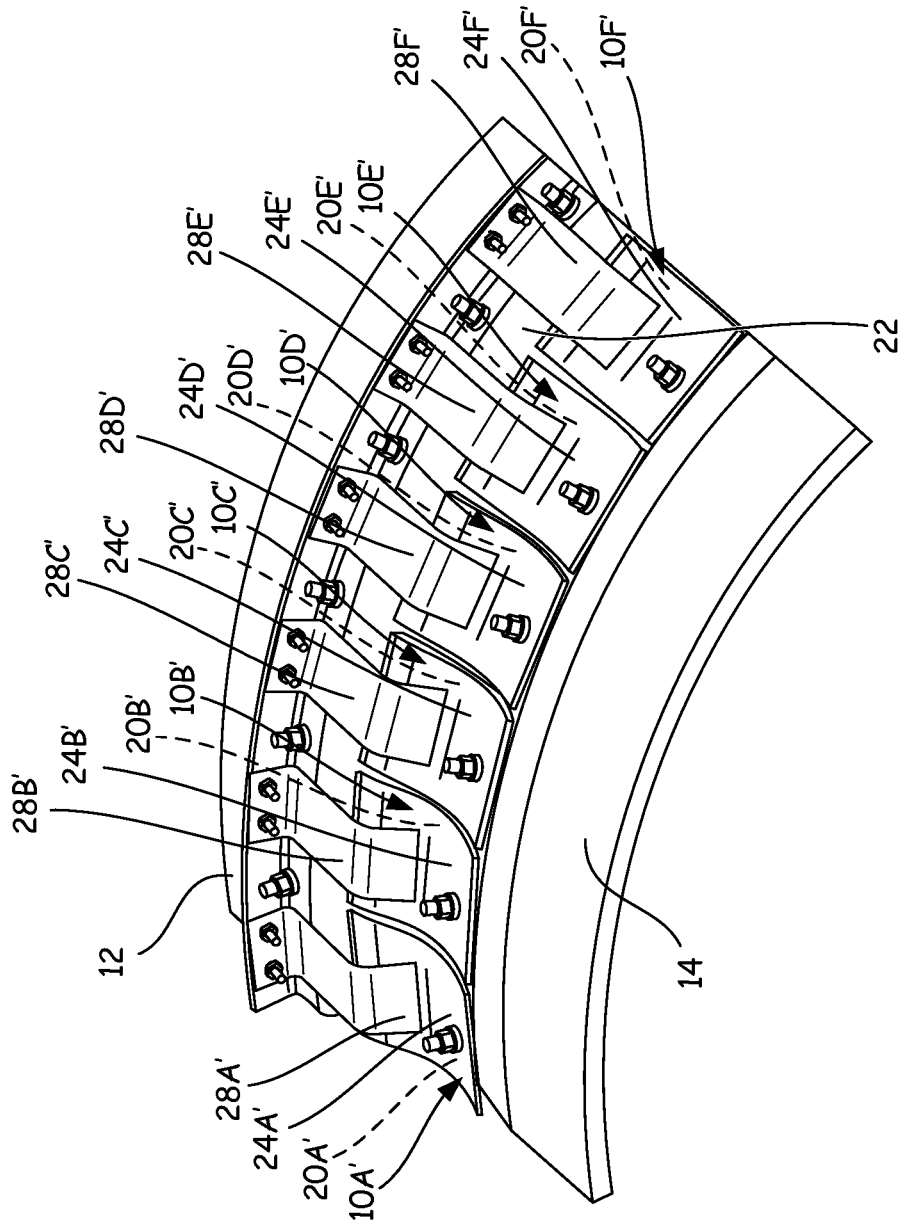
FIG. 4B is a perspective view of a second side of the embodiment of the series of the seal segments seen in FIG. 4A, illustrating a continuous wire mesh hinge.

FIG. 4A is a perspective view of a first side of an embodiment of a series of seal segments 10' arranged between a curved surface of first gas turbine engine component 12 and a curved surface of second gas turbine engine component 14. FIG. 4B is a perspective view of a second side of the embodiment of the series of seal segments 10' seen in FIG. 4A, illustrating continuous wire mesh 22'. The series of seal segments 10' includes seal segment 10A', seal segment 10B', seal segment 10C', seal segment 10D', seal segment 10E', and seal segment 10F'. Seal segment 10A' includes flapper seal 20A', wire mesh 22', backing sheet 24A', and finger spring 28A'. Seal segment 10B' includes flapper seal 20B', wire mesh 22', backing sheet 24B', and finger spring 28B'. Seal segment 10C' includes flapper seal 20C', wire mesh 22', backing sheet 24C', and finger spring 28C'. Seal segment 10D' includes flapper seal 20D', wire mesh 22', backing sheet 24D', and finger spring 28D'. Seal segment 10E' includes flapper seal 20E', wire mesh 22', backing sheet 24E', and finger spring 28E'. Seal segment 10F' includes flapper seal 20F', wire mesh 22', backing sheet 24F', and finger spring 28F'.

Seal segments 10A'-10F' are positioned adjacent each other to seal the gap between the curved surface of first gas turbine engine component 12 and the curved surface of second gas turbine engine component 14. Seal segments 10A-10F' are curved along direction C because they are sealing two curved surfaces. Seal segments 10A'-10F' each have separate flapper seals 12', backing sheets 24', and finger springs 28' but each include the same segment of wire mesh 22'. Wire mesh 22' is continuous and extends across the series of seal segments 10' so that it covers the gap between seal segments 10A' and 10B', the gap between seal segments 10B' and 10C', the gap between seal segments 10C' and 10D', the gap between seal segments 10D' and 10E', and the gap between seal segments 10E' and 10F'.

Seal segments 10' will result in a tight seal between first gas turbine engine component 12 and second gas turbine engine component 14 because seal segments 10' curve along direction C. Using seal segments 10' to seal curved surfaces allows for a smooth and continuous surface for air flow between first gas turbine engine component 12 and second gas turbine engine component 14. Using the same segment of wire mesh 22' among all of the seal segments 10' reduces leakage from gaps between seal segments 10' and gives greater structural integrity to the series of seal segments 10'. Leakage is typically greatest between seal segments sealing curved surfaces, so continuous wire mesh 22 is especially beneficial in this embodiment.

In an alternate embodiment, wire mesh 22' is not a single segment but a plurality of segments of wire mesh 22'. However, wire mesh 22' is still continuous across gaps between seal segments 10' arranged in a series. Consequently, wire mesh 22' in this embodiment still reduces leakage from gaps between seal segments 10' while also allowing for simplified seal assembly to accommodate a large gap.

The following are non-exclusive descriptions of possible embodiments of the present invention.

A seal segment includes a flapper seal having a first surface and a second surface, a wire mesh acting as a hinge for the flapper seal, and a spring. The wire mesh includes a first section connected to the first surface of the flapper seal, and a second section connected to the first section. The spring includes a first end in contact with the first section of the wire mesh to apply pressure to the first surface of the flapper seal, and a second end adjacent the second section of the wire mesh.

The seal segment of the preceding paragraph can optionally include, additionally and/or alternatively, any one or more of the following features, configurations and/or additional components:

The seal segment further includes a fastener connecting the wire mesh to the flapper seal.

The seal segment further includes a backing sheet positioned between the first section of the wire mesh and the first end of the spring.

The seal segment further includes a fastener connecting the wire mesh and the backing sheet to the flapper seal.

The backing sheet is a metal, ceramic, or composite material.

The seal segment further includes a bracket including a first end connected to the second section of the wire mesh, and a second end connected to the second end of the spring.

The seal segment further includes a first fastener connecting the wire mesh and the first end of the bracket, and a second fastener connecting the spring and the second end of the bracket.

The second section of the wire mesh is folded over.
The second section of the wire mesh is brazed.
The seal segment is arcuate.
The flapper seal is arcuate.
The flapper seal is metal.
The wire mesh is metal.
The spring is metal.
The spring is a finger spring.

A seal formed by a plurality of seal segments, wherein each seal segment includes a flapper seal, a wire mesh acting as a hinge for the flapper seal, a backing sheet connected to the wire mesh, a first fastener connecting the wire mesh and the backing sheet to the flapper seal, and a spring. The spring includes a first end in contact with the backing sheet to apply pressure to the flapper seal and a second end. The seal further includes a bracket, a second fastener connecting the wire mesh and the bracket, and a third fastener connecting the second end of the spring to the bracket.

The seal of the preceding paragraph can optionally include, additionally and/or alternatively, any one or more of the following features, configurations and/or additional components:

The wire mesh spans a plurality of gaps between the plurality of seal segments.

The wire mesh is a single and continuous segment and spans a plurality of gaps between the plurality of seal segments.

The seal segments are curved and positioned to form one continuous arc.

An assembly includes a first gas turbine engine component, a second gas turbine engine component, and a seal extending between the first gas turbine engine component and the second gas turbine engine component. The seal includes a flapper seal in contact with a first gas turbine engine component and a second gas turbine engine component and a wire mesh acting as a hinge for the flapper seal. The wire mesh includes a first section connected to the flapper seal, and a second section connected to the first gas turbine engine component. The seal further includes a backing sheet connected to the first section of the wire mesh and a spring. The spring includes a first end in contact with the backing sheet to apply pressure to the flapper seal, and a second end connected to the first gas turbine engine component. The seal further includes a bracket including a first end connected to the first gas turbine engine component, wherein the second section of the wire mesh is between the first end of the bracket and the first gas turbine engine component, and a second end connected to the second end of the spring, wherein the second end of the bracket connects the second end of the spring to the first gas turbine engine component.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodi-

The invention claimed is:

1. A seal segment comprising:
    a flapper seal having a first surface and a second surface;
    a wire mesh acting as a hinge for the flapper seal, the wire mesh including:
        a first section connected to the first surface of the flapper seal; and
        a second section connected to the first section;
    a spring comprising:
        a first end positioned to apply pressure to the first surface of the flapper seal; and
        a second end adjacent the second section of the wire mesh; and
    a bracket including:
        a first end directly fixed to the second section of the wire mesh; and
        a second end directly fixed to the second end of the spring.

2. The seal segment of claim 1, further comprising a fastener connecting the wire mesh to the flapper seal.

3. The seal segment of claim 1, further comprising a backing sheet positioned between the first section of the wire mesh and the first end of the spring.

4. The seal segment of claim 3, further comprising a fastener connecting the wire mesh and the backing sheet to the flapper seal.

5. The seal segment of claim 3, wherein the backing sheet is a metal, ceramic, or composite material.

6. The seal segment of claim 1, further comprising: a first fastener connecting the wire mesh and the first end of the bracket; and a second fastener connecting the spring and the second end of the bracket.

7. The seal segment of claim 1, wherein the second section of the wire mesh is folded over.

8. The seal segment of claim 1, wherein the second section of the wire mesh is brazed.

9. The seal segment of claim 1, wherein the seal segment is arcuate.

10. The seal segment of claim 1, wherein the flapper seal is arcuate.

11. The seal segment of claim 1, wherein the flapper seal is metal.

12. The seal segment of claim 1, wherein the wire mesh is metal.

13. The seal segment of claim 1, wherein the spring is metal.

14. The seal segment of claim 1, wherein the spring is a finger spring.

15. A seal having a plurality of seal segments, each seal segment comprising:
    a flapper seal;
    a wire mesh acting as a hinge for the flapper seal, wherein the wire mesh spans a plurality of gaps between the plurality of seal segments;
    a backing sheet connected to the wire mesh;
    a first fastener connecting the wire mesh and the backing sheet to the flapper seal;
    a spring including:
        a first end in contact with the backing sheet to apply pressure to the flapper seal; and
        a second end;
    a bracket;
    a second fastener connecting the wire mesh and the bracket; and
    a third fastener connecting the second end of the spring to the bracket.

16. The seal of claim 15, wherein the wire mesh is a single and continuous segment and spans a plurality of gaps between the plurality of seal segments.

17. The seal of claim 15, wherein the seal segments are curved and positioned to form one continuous arc.

18. An assembly comprising:
    a first gas turbine engine component;
    a second gas turbine engine component; and
    a seal extending between the first gas turbine engine component and the second gas turbine engine component, the seal comprising:
        a flapper seal in contact with the first gas turbine engine component and the second gas turbine engine component;
        a wire mesh acting as a hinge for the flapper seal, the wire mesh including:
            a first section connected to the flapper seal; and
            a second section connected to the first gas turbine engine component;
        a backing sheet connected to the first section of the wire mesh;
        a spring including:
            a first end in contact with the backing sheet to apply pressure to the flapper seal; and
            a second end connected to the first gas turbine engine component; and
        a bracket including:
            a first end connected to the first gas turbine engine component, wherein the second section of the wire mesh is sandwiched between the first end of the bracket and the first gas turbine engine component; and
            a second end connected to the second end of the spring, wherein the second end of the bracket connects the second end of the spring to the first gas turbine engine component.

* * * * *